United States Patent [19]

Scott et al.

[11] 4,423,546
[45] Jan. 3, 1984

[54] PUNCH PRESS WITH AUTOMATIC TOOL CHANGER

[75] Inventors: William B. Scott, Rochelle; Daniel C. Dickinson, Pecatonica; Joel C. E. Arnesson, Rockford, all of Ill.

[73] Assignee: W. A. Whitney Corp., Rockford, Ill.

[21] Appl. No.: 299,391

[22] Filed: Sep. 4, 1981

[51] Int. Cl.³ ............................................. B23Q 3/157
[52] U.S. Cl. ........................................ 29/568; 72/446
[58] Field of Search ............... 29/568, 400 R; 83/563, 83/698; 72/446

[56] References Cited

U.S. PATENT DOCUMENTS

| | | | |
|---|---|---|---|
| 3,662,442 | 5/1972 | Noa | 29/568 X |
| 3,678,562 | 7/1972 | Leibinger | 29/400 |
| 3,721,154 | 3/1973 | Leibinger et al. | 83/698 |
| 3,816,904 | 6/1974 | Herb | 29/568 |
| 3,911,540 | 10/1975 | Johnson | 29/568 X |
| 3,938,416 | 2/1976 | Beauplat | 83/552 |
| 4,141,133 | 2/1979 | Grinage | 29/568 |
| 4,349,946 | 9/1982 | McMurtry | 29/568 X |

FOREIGN PATENT DOCUMENTS 2739534  3/1979  Fed. Rep. of Germany ........ 29/568

OTHER PUBLICATIONS

Precision NC Punching and Nibbing Machine/Trumpf, Brochure No. 5051/A/Trumpf America Inc.

Primary Examiner—William R. Briggs
Attorney, Agent, or Firm—Leydig, Voit, Osann, Mayer & Holt, Ltd.

[57] ABSTRACT

The punch, stripper and die holders of a punch press are moved bodily toward an indexable turret and automatically pick up a punch, a stripper and a die from the turret preparatory to being shifted bodily away from the turret to perform a punching operation. When the punching operation is completed, the holders return the tools to the turret, the turret is indexed and then the holders pick up a different set of tools from the turret. Means are provided for shielding vulnerable areas of the holders from debris created during the operation of a plasma-arc torch which is associated with the press. The tools on the turret also are shielded from the debris.

5 Claims, 11 Drawing Figures

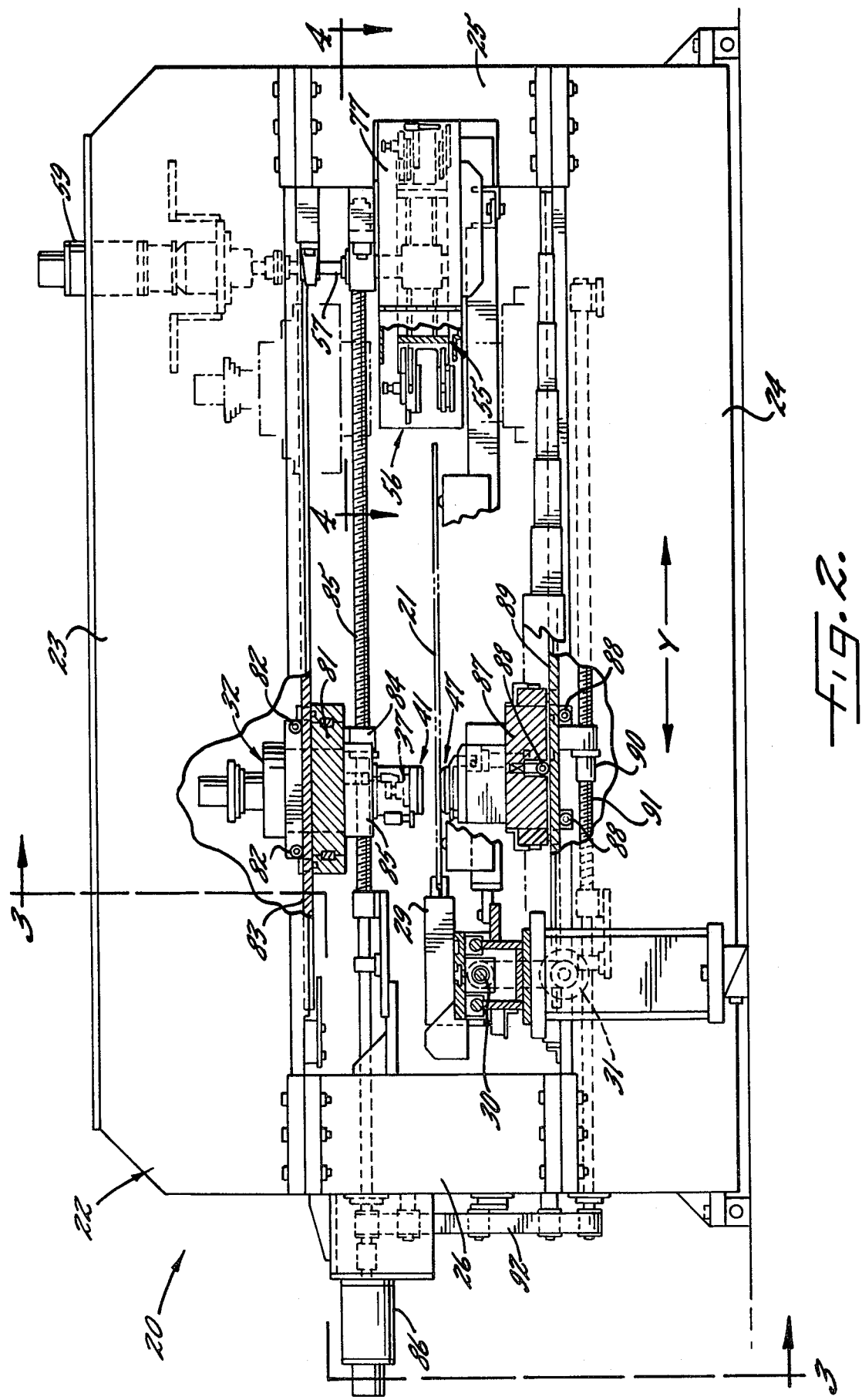

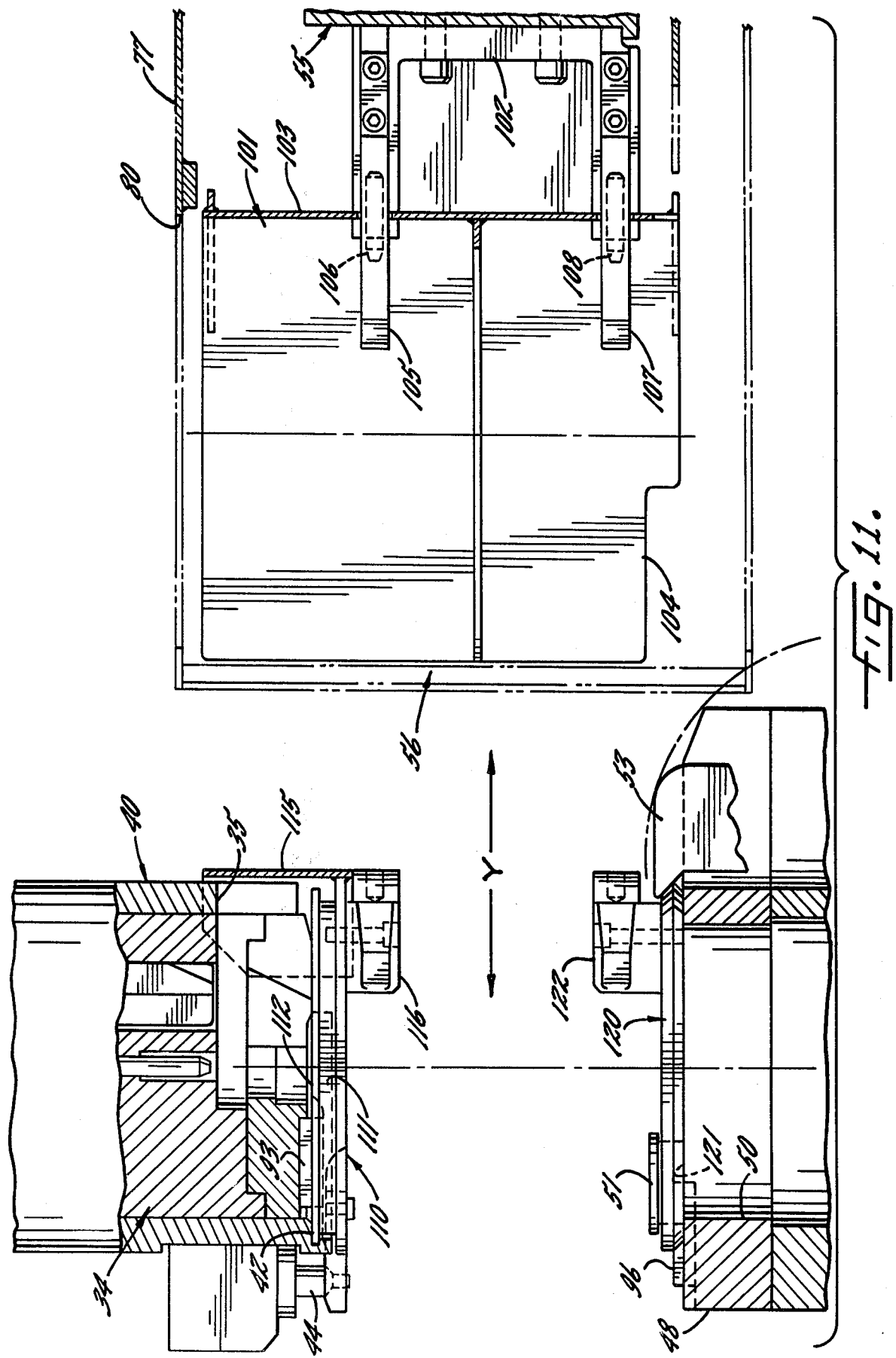

PUNCH PRESS WITH AUTOMATIC TOOL CHANGER

BACKGROUND OF THE INVENTION

This invention relates to a punch press of the type in which a vertically reciprocable punch coacts with an underlying die to form a hole in an intervening workpiece. A stripper usually encircles the punch and holds the workpiece downwardly against the die when the punch is retracted in order to prevent the workpiece from being lifted upwardly by the punch.

The invention more particularly relates to a punch press of the tool changing type in which the punch, the stripper and the die are adapted to be removed automatically from their respective holders and replaced with another set of tools of a different size or shape. Tool changing presses have been marketed previously by Trumpf & Co. and include a magazine which holds several sets of vertically alined punches, strippers and dies. The magazine is indexed to bring a given set of tools to a tool changing station and then the tools are transferred from the magazine to the various holders. When the punching operation has been completed, the tools are transferred from the holders to the magazine preparatory to the magazine being indexed to bring a different set of tools to the tool changing station.

The press of the present invention preferably is equipped with a metal melting tool such as a plasma-arc torch of the type disclosed in Brolund et al U.S. Pat. No. 4,063,059. The torch is used to cut large and irregularly shaped openings in the workpiece and usually operates while the punch is inactive.

SUMMARY OF THE INVENTION

The general aim of the present invention is to provide a new and improved tool changing punch press in which the transfer of tools between the holders and the magazine is simplified by bodily shifting the holders themselves toward and away from the magazine with the holders being adapted to automatically pick up a set of tools from the magazine when the holders are first shifted toward the magazine and then to automatically return the tools to the magazine when the holders are next shifted toward the magazine. With this arrangement, the need for intermediate mechanism for transferring the tools between the holders and the magazine is completely eliminated. In addition, the bodily movement of the holders toward and away from the magazine is advantageously used to selectively position the punch and die along one rectilinear axis relative to the workpiece so that the workpiece itself need not be shifted along that axis but instead need merely be repositioned along a perpendicular axis. Being shiftable only along one axis, the workpiece may be supported in a more rigid manner than is the case where it is necessary to shift the workpiece along two mutually perpendicular axes.

Another object of the invention is to provide a tool changing punch press in which the tools in the magazine and in which certain vulnerable areas of the tool holders are protected from debris created during operation of the metal melting tool. This is achieved through the use of a unique shield which is brought into active position to protect the tools in the magazine when the melting tool is being operated, and further through the use of shield-like dummy tools adapted to be inserted automatically into the tool holders to cover vulnerable areas thereof.

These and other objects and advantages of the invention will become more apparent from the following detailed description when taken in conjunction with the accompanying drawings.

BRIEF DESCRIPTION OF THE DRAWINGS

FIG. 2 is an enlarged fragmentary cross-section taken substantially along the line 2—2 of FIG. 1.

FIG. 11 is a view somewhat similar to FIG. 10 but shows the dummy tools inserted into the tool holders.

DETAILED DESCRIPTION OF THE PREFERRED EMBODIMENT

Figure 1:
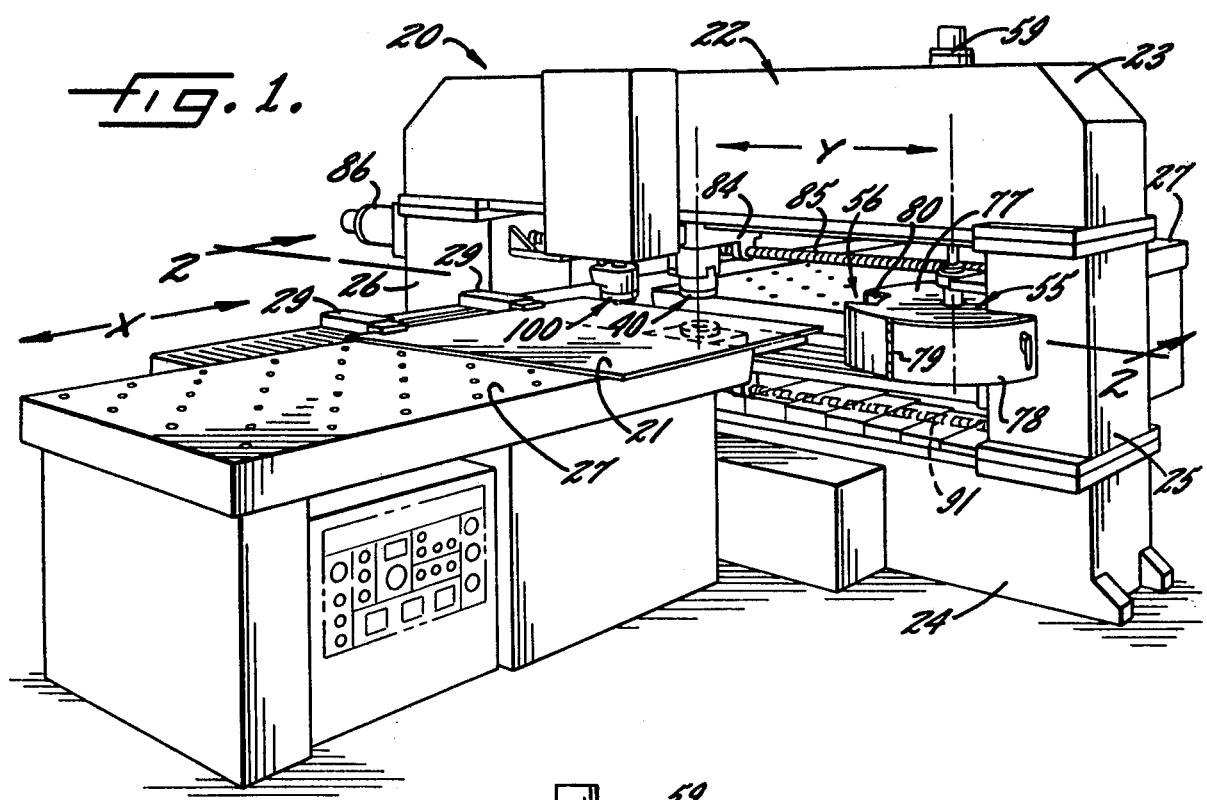
FIG. 1 is a perspective view of a new and improved punch press incorporating the unique features of the present invention.
Figure 3:
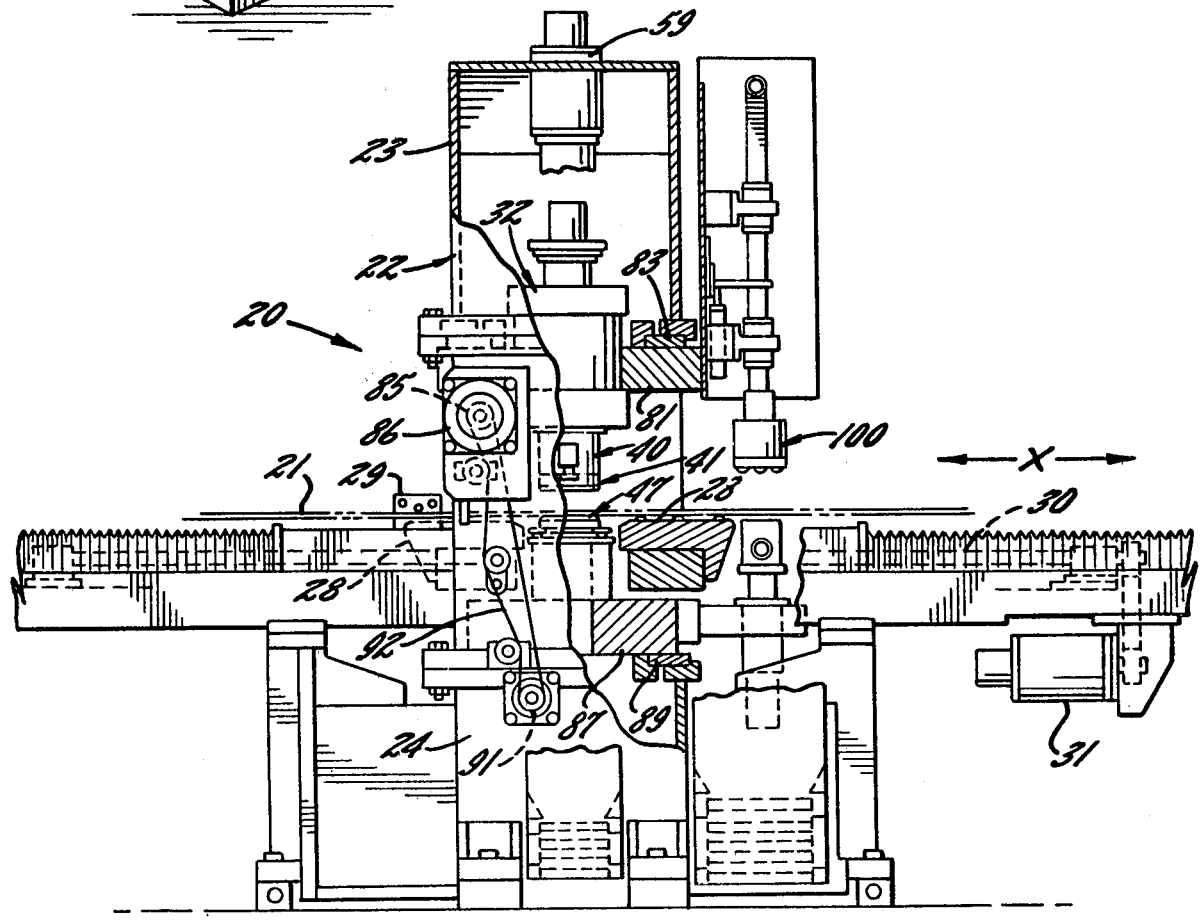
FIG. 3 is a fragmentary cross-section taken substantially along the line 3—3 of FIG. 2.

As shown in the drawings for purposes of illustration, the invention is embodied in a punch press 20 for forming holes through a flat workpiece 21 such as a piece of sheet metal. The machine includes a main support or frame 22 which herein is formed by an overhead bridge 23, by an underlying base 24 and by front and rear columns 25 and 26 extending between the base and the bridge. The various frame members define a large and generally rectangular opening or throat within which a portion of the workpiece is located and within which the punching operation takes place. Tables 27 are disposed on opposite sides of the frame to support the workpiece, there being additional table structure 28 (FIG. 3) within the throat. The workpiece is adapted to be shifted laterally (i.e., to the left or right as viewed in FIGS. 1 and 3) on the tables along an X-axis by clamps 29 which grip the rear margin of the workpiece. The clamps are operably connected to a lead screw 30 (FIGS. 2 and 3) extending along the rear of the tables and are shifted when the lead screw is rotated by a motor 31.

Figure 6:
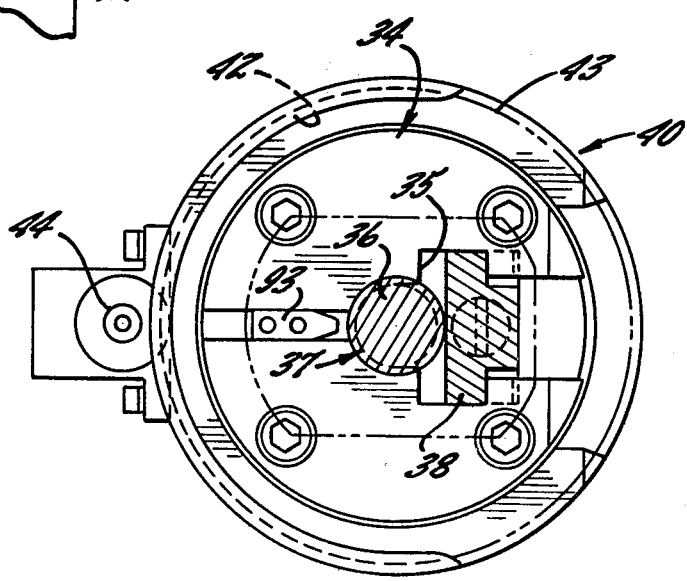
FIGS. 6, 7 and 8 are fragmentary cross-sections taken substantially along the lines 6—6, 7—7 and 8—8, respectively, of FIG. 5.

A hydraulic actuator 31 is supported by the bridge 23 of the frame 22 and includes a vertically reciprocable ram 33 (FIG. 5) whose lower end carries a punch holder 34. Opening out of the lower end and the forward side of the punch holder is an opening or socket 35 (FIGS. 5 and 6) which is adapted to receive the shank 36 of a punch 37. The punch is adapted to be locked releasably in the holder by retaining means in the form of a clamp 38 which may be reciprocated upwardly and downwardly within the punch holder by a pneumatic actuator 39 (FIG. 5) carried by the punch holder. When the clamp 38 is retracted upwardly, the forward side of the socket 35 is open and thus the shank 36 of the punch 37 may move radially into and out of the socket. After the shank has been inserted into the socket, the clamp is shifted downwardly to close off the forward side of the socket and to lock the shank securely in the punch holder (see FIG. 5).

Surrounding the punch holder 34 is a sleeve-like stripper holder 40 (FIG. 5) whose lower end carries a stripper 41 which encircles the lower end portion of the punch 37. The stripper holder 40 is movable upwardly and downwardly with the punch holder 34 but also is movable upwardly and downwardly relative to the punch holder. When the ram 33 is shifted downwardly, the punch 34 and the stripper 41 move downwardly in unison until the stripper engages and is stopped by workpiece 21. Thereafter, the punch moves downwardly relative to the stripper and forms a hole through the workpiece. When the punch is first retracted upwardly, the stripper remains in engagement with the workpiece and prevents the workpiece from being pulled upwardly by the punch. After the punch has been retracted out of the workpiece, the stripper moves upwardly to permit re-positioning of the workpiece. Reference may be made to Brolund et al U.S. Pat. No. 3,722,337 for a more detailed disclosure of the manner in which a stripper is actuated.

The lower end portion of the stripper holder 40 is formed with an annular groove 42 (FIGS. 5 and 6) which is adapted to receive a flange 43 on the upper end portion of the stripper 41. The forward side of the stripper holder 40 is open and thus the upper end portion of the stripper may be moved radially into the holder to cause the flange 43 to seat within the groove 42. Thereafter, a retaining means in the form of a pneumatically actuated shot pin 44 (FIG. 5) is shifted downwardly and enters an apertured ear 45 on the stripper 41 to lock the stripper within the holder 40.

Figure 8:
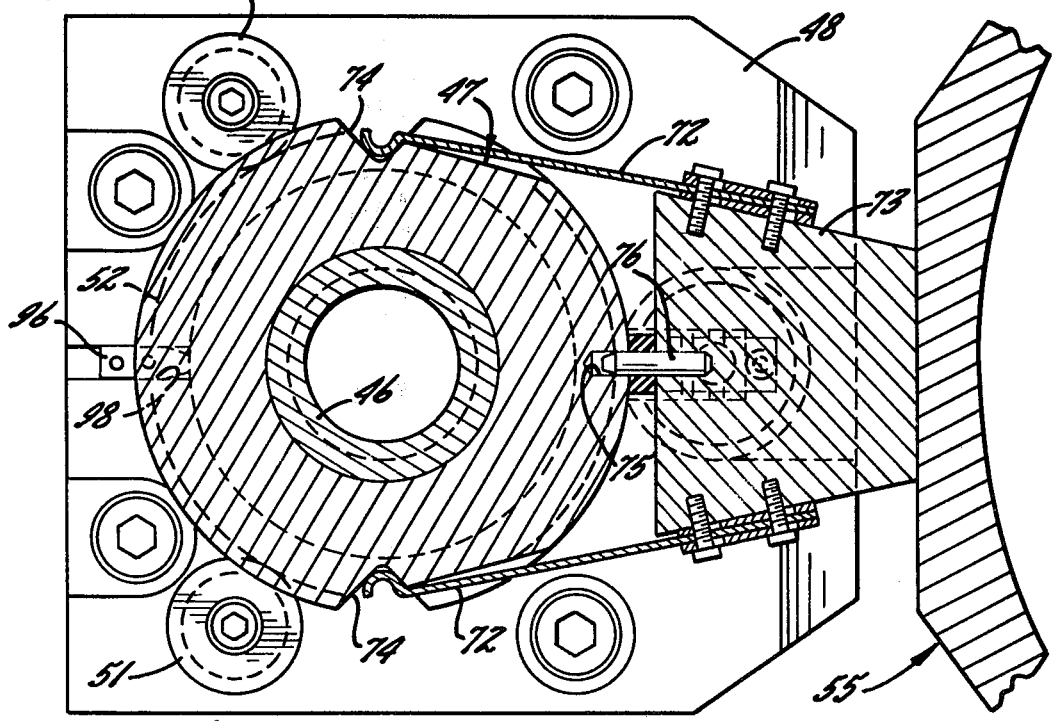

Alined vertically with the punch 37 and the stripper 41 is an apertured die 46 (FIGS. 5 and 8) which coacts with the punch to form a hole in the workpiece 21 when the punch is shifted downwardly. The die is secured rigidly within a die adaptor 47 which is supported releasably on a die holder 48. The die holder, in turn, is secured to a bolster 49 which is supported on the bed 24 of the frame 22. An opening 50 is formed through the die holder 48 and defines a slug chute which extends through the bolster 49.

Figure 5:
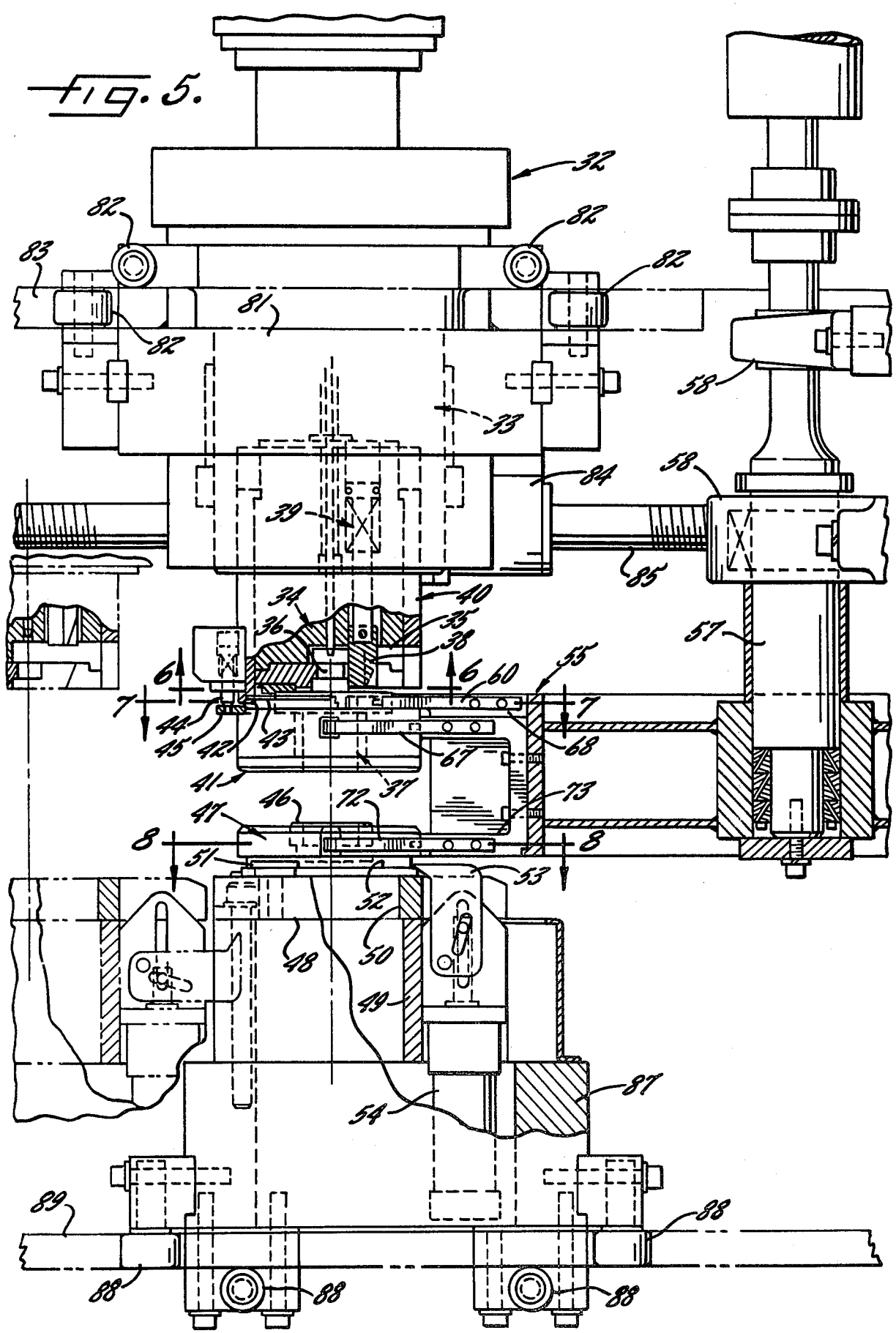
FIG. 5 is an enlarged fragmentary cross-section taken substantially along the line 5—5 of FIG. 4.

The die holder 48 includes two flanged buttons 51 (FIG. 8) which are adapted to seat within an annular groove 52 around the die adaptor 47 to locate the adaptor on the holder 48. The adaptor may be moved radially onto and off of the holder from the outer side thereof and is adapted to be clamped downwardly against the holder and radially against the buttons by a vertically shiftable and pivotally mounted retaining means or locking arm 53 (FIG. 5). When shifted upwardly by a pneumatic actuator 54, the arm 53 swings upwardly and rearwardly to the position shown in solid lines in FIG. 5, and enters into the groove 52 to clamp the die adaptor 47 to the die holder 48. Upon being retracted, the arm swings downwardly and forwardly to a position below the upper end of the die holder as shown in phantom lines in FIG. 5 and thus permits the die adaptor to be moved radially onto or off of the holder.

The present punch press 20 is an automatic tool changing press in that it includes a magazine 55 which holds several sets of tools with each set comprising a punch 37, a stripper 41 and a die 46. When a given punching operation is completed, the tools in the holders 34, 40 and 48 are adapted to be automatically removed therefrom and automatically replaced with a different set of tools from the magazine so that a different punching operation may be performed.

In accordance with the primary aspect of the present invention, the holders 34, 40 and 48 move bodily toward the magazine 55 to receive tools 37, 41 and 46 from and to return the tools to the magazine at a tool changing station 56 (FIGS. 2 and 4) with the exchange being effected automatically as an incident to the bodily movement of the holders and without need of any intermediate mechanism for transferring the tools. The same bodily movement which is used to shift the holders relative to the magazine for tool changing purposes also is used to position the punch 37 and the die 46 forwardly and rearwardly along a Y-axis relative to the workpiece 21. As a result, the workpiece itself need not be re-positioned along that axis and thus the workpiece may be supported in a comparatively rigid manner.

More specifically, the magazine 55 comprises a turret which is located in the forward end portion of the throat of the frame 22. The turret 55 is supported to rotate with an upright shaft 57 (FIG. 5) journaled by bearings 58 which are secured to the forward column 25 of the frame 22. A reversible motor 59 (FIG. 2) is supported on the bridge 23 of the frame and is operably connected to the shaft 57. When the motor is energized, the turret is indexed about an upright axis which always remains in a fixed position relative to the frame.

Figure 7:
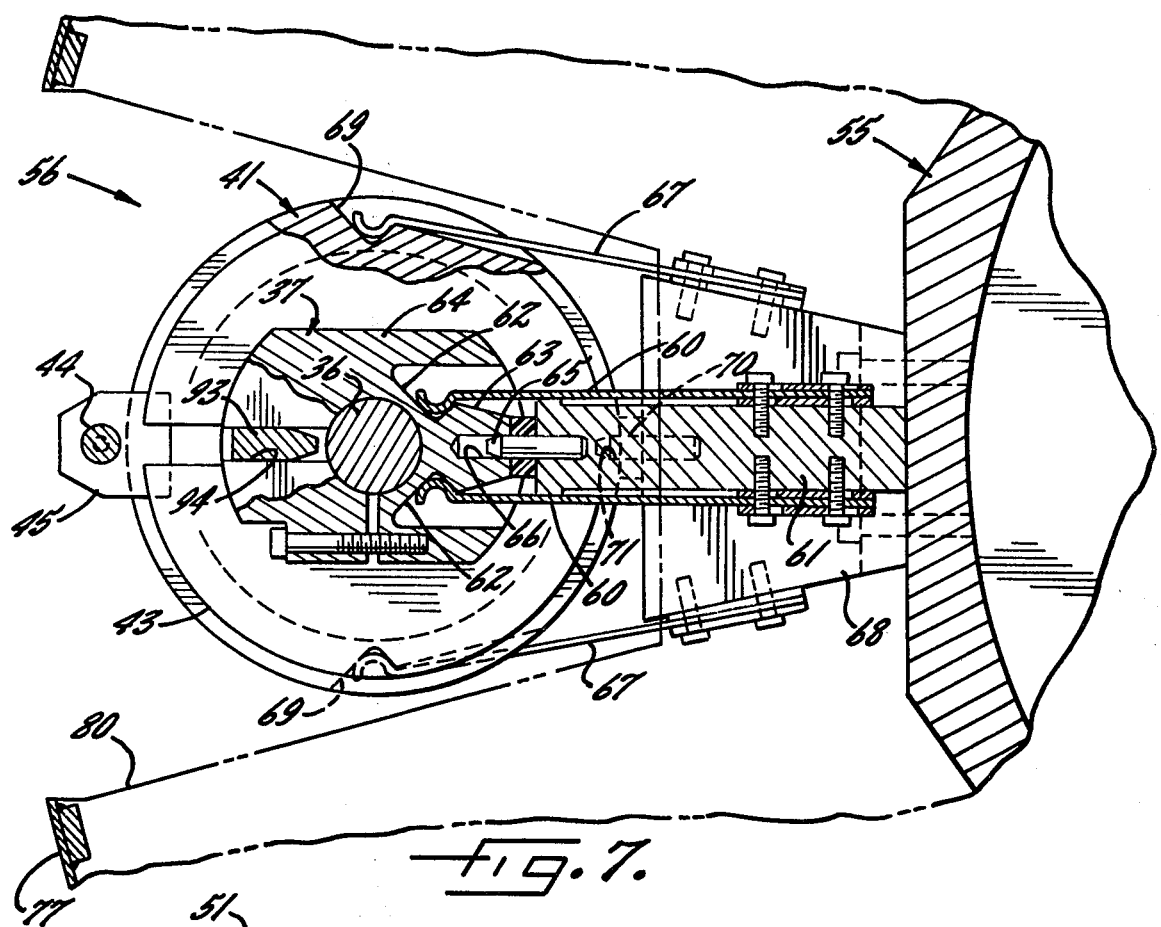

In the present instance, nine sets of tools are spaced angularly around and are held releasably by the turret 55 (see FIG. 4) with each set comprising an upper punch 37, an intermediate stripper 41 and a lower die adaptor 47 with a die 46. Each punch is held releasably by an upper pair of spring fingers 60 (FIG. 7) whose inner end portions are cantilevered on a bracket element 61 extending outwardly from the turret. The free end portions of the fingers are adapted to snap into notches 62 formed in the sides of a nose 63 which is integral with a collar 64 attached rigidly to the shank 36 of the punch. An outwardly projecting pin 65 is secured to the bracket element 61 and is adapted to telescope slidably into a hole 66 formed in the nose. Thus, the fingers and the pin coact to hold the punch releasably on the turret.

Each stripper 41 is held on the turret 55 by another pair of spring fingers 67 (FIG. 7) located beneath the fingers 60 and having inner end portions which are cantilevered on a bracket element 68 on the turret. The free end portions of the fingers 67 are adapted to snap into notches 69 formed in the sides of the stripper. In addition, a pin 70 projects outwardly from the bracket element 68 and is adapted to telescope into a hole 71 in the stripper, the fingers 67 and the pin 70 thus serving to hold the stripper releasably on the turret.

Two additional spring fingers 72 (FIG. 8) are located below the fingers 67 and are cantilevered at their inner end portions on a bracket element 73 on the turret 55. Notches 74 are formed in the sides of the die adaptor 47 and receive the free ends of the fingers 72 with a snap fit while a hole 75 in the die adaptor telescopically receives a pin 76 projecting outwardly from the bracket element 73.

Thus, the punch 37, the stripper 41 and the die adaptor 47 of each tool set may be placed on the turret 55 by moving the tools radially toward the turret. As an incident thereto, the fingers 60, 67 and 72 are cammed apart and then snap into the notches 62, 69 and 74, respectively. At the same time, the holes 66, 71 and 75 slide over the pins 65, 70 and 76, respectively, and thus the pins help hold the weight of the tools while preventing the tools from turning. Removal of the tools from the turret may be effected by moving the tools radially away from the turret to overcome the gripping force of the spring fingers.

The turret 55 and the tools which are held thereby are enclosed by a generally cylindrical housing 77 (FIG. 4) which extends above and below the tools and around the outer sides of the tools. A portion of the housing is formed by a door 78 which is hinged at 79 and which may be swung open to permit tools to be manually loaded onto and unloaded from the turret. An opening 80 is formed in the housing at the tool changing station 56 so that each set of tools which is indexed to that station is exposed and may be transferred to the holders 34, 40 and 48.

In carrying out the invention, the punch, stripper and die holders 34, 40 and 48 are adapted to be moved toward the turret 55 to exchange tools with the turret at the tool changing staation 56. For this purpose, the punch actuator 32 is mounted on a carriage 81 (FIG. 2) which is adapted to be moved back and forth on the frame 22 along the Y-axis, the punch and stripper holders 34 and 40 moving with the actuator. Rollers 82 (FIGS. 2 and 5) are mounted on the carriage and support the carriage for back and forth movement along ways 83 which extend along the bridge 23. To effect such movement, a ball nut 84 is connected rigidly to the lower side of the carriage and is advanced along a ball screw 85 when the latter is rotated. The ball screw extends between and and is rotatably supported by the columns 25 and 26 and is connected to a reversible motor 86 (FIG. 2) mounted on the rear column 26 and selectively operable to rotate the screw.

The die holder 48 is mounted on an second carriage 87 (FIG. 2) having rollers 88 which engage ways 89 on the bed 24 to guide the carriage for back and forth movement along the Y-axis. A ball nut 90 is secured rigidly to the lower side of the carriage 87 and is threaded onto a lower ball screw 91 which parallels the upper screw 85. The lower screw is rotatably supported by the bed and is adapted to be rotated in synchronism with the upper screw by a timing belt 92 which is operably connected between cogged pulleys on the rear end portions of the screws. Accordingly, rotation of the screws causes the carriages 81 and 87 to either move forwardly or rearwardly along the Y-axis with the punch holder 34 and the stripper holder 40 being maintained in vertical alinement with the die holder 48 during such movement. By thus moving the carriages, the punch 37 and the die 46 are moved relative to the workpiece 21 and may be located to punch holes in various positions along the Y-axis. As a result, it is not necessary to move the workpiece itself along the Y-axis and thus the tables 27 and 28 need not move but instead may be solidly mounted to provide a stiff support for the workpiece.

To explain a tool changing operation, let it be assumed that a given punch 37, stripper 41 and die 46 are locked in their respective holders 34, 41 and 48 and that a punching operation which requires those tools has been completed. Let it be further assumed that the turret 55 is positioned such that the fingers 60, 67 and 72 which are disposed in the tool changing station 56 are empty.

A tool changing operation is initiated by energizing the motor 86 to cause the screws 85 and 91 to advance the carriages 81 and 87 forwardly toward the turret 55. As the holders 34, 40 and 48 move into the tool changing station 56, the fingers 60, 67 and 72 and the pins 65, 70 and 76 grip and hold the punch 37, the stripper 41 and the die adaptor 47 which are locked in the holders (see position shown in solid lines in FIG. 5). Thereafter, the clamp 38, the shot pin 44 and the arm 53 are moved to their released positions to unlock the tools from the holders.

The carriages 81 and 87 then are retracted to move the holders 34, 40 and 48 rearwardly a short distance away from the turret 55 to a standby position (see the position shown in phantom lines in FIG. 5) in which the holders are clear of the turret. As the carriages are retracted, the holders move away from the punch 37, the stripper 41 and the die adaptor 47 and leave the tools on the turret. The turret then is indexed to bring a new set of tools into the tool changing station 56. Thereafter, the holders are again advanced toward the turret to cause the holders to move into embracing relationship with the new tools. As the punch holder 34 moves toward the punch 37, a key 93 (FIG. 7) in the punch holder slides into a keyway 94 in the collar 64 of the punch to prevent the punch from rotating. Similarly, a key 96 (FIG. 8) on the die holder 48 moves into a keyway 98 in the stripper 41 and die adaptor 47.

Once the holders 34, 49 and 48 have moved forwardly to the proper position to receive the tools, the clamp 38, the shot pin 44 and the arm 53 are shifted to their locked positions to retain the tools in the holders (see FIG. 5). The holders then are shifted rearwardly and, as an incident thereto, the tools are pulled out of the fingers 60, 67 and 72 and off of the pins 65, 70 and 76. Therefore, the holders may be moved to any desired position along the Y-axis to cause the punch and die to form a hole in a selected area of the workpiece 21.

From the foregoing, it will be apparent that the present invention brings to the art a new and improved tool changing punch press 20 in which the holders 34, 40 and 48 move bodily toward and away from the turret 55 to exchange tools. No intermediate mechanism is required for transferring the tools between the turret and the holders and, in addition, the turret need not be mounted for any movement other than rotation. The movement which the holders undertake in shifting toward and away from the turret to change tools also is used to position the punch and the die along the Y-axis and thus the workpiece 21 itself need not be re-positioned along that axis.

In adddition to forming holes in the workpiece 21 by a punching operation, the press 20 includes a tool for melting the workpiece to form large and irregularly shaped holes or cuts. Herein the metal melting tool comprises a plasma-arc torch 100 (FIGS. 1 and 3) which is located along one side of the bridge 23 and which is connected to the carriage 81 to move back and forth along the Y-axis. The operation of a plasma-arc torch is well known and is described in Brolund et al U.S. Pat. No. 4,063,059. Briefly, the torch operates by ionizing a column of gas with an electric arc to produce a high temperature plasma stream which melts the workpiece and blows the molten metal away from the workpiece. The torch 100 and the punch 37 do not operate simultaneously and thus the punch is inactive during operation of the torch.

Although the torch 100 performs a very useful function, its operation creates debris such as dross and slag in the area of the press 20. According to another aspect of the invention, the tools which are carried by the turret 55 are uniquely protected from the debris of the torch. In addition, provision is made to shield vulnerable areas of the holders 34, 40 and 48 from the debris.

Figure 4:
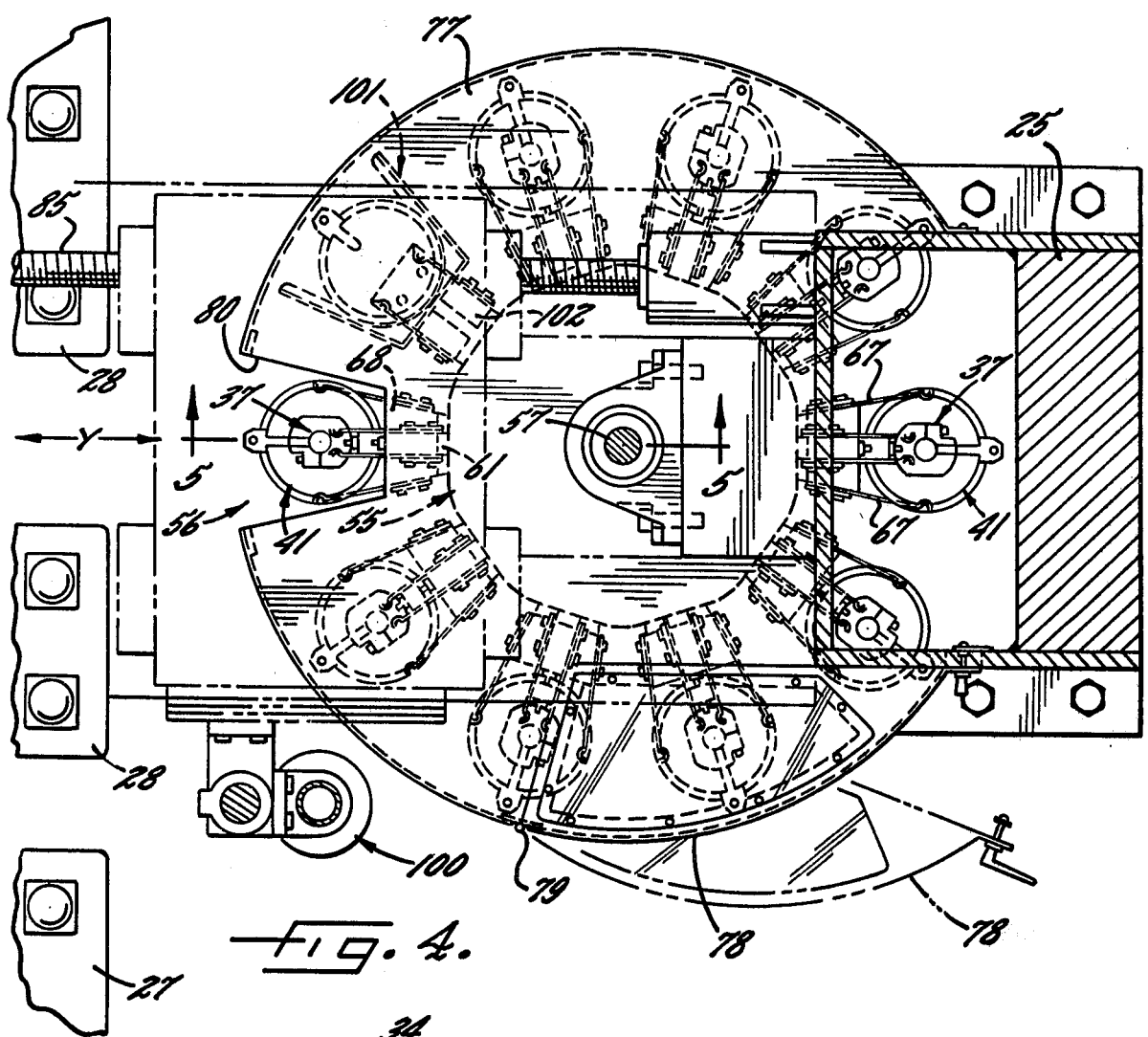
FIG. 4 is an enlarged fragmentary cross-section taken substantially along the line 4—4 of FIG. 2.

To protect the tools on the turet 55 from debris, the turret carries a shield 101 (FIGS. 9 to 11) which is indexed to the tool changing station 56 and which effectively closes off the opening 80 in the housing 77 when the torch 100 is operating. As shown in FIG. 4, the shield 101 is located on the turret between two adjacent sets of tools and is attached to a bracket 102 (FIG. 9) on the outer side of the turret. The shield corresponds substantially in shape to the opening 80 in the housing 78 and includes two upright side walls 103 and an upright inner wall 104 which extend from an elevation just above the bottom wall of the housing to an elevation just short of the top wall. Wnen the shield is in the tool changing station 56, it closes off the opening 80 and prevents debris from entering the housing and collecting on the tools therein.

Figure 9:
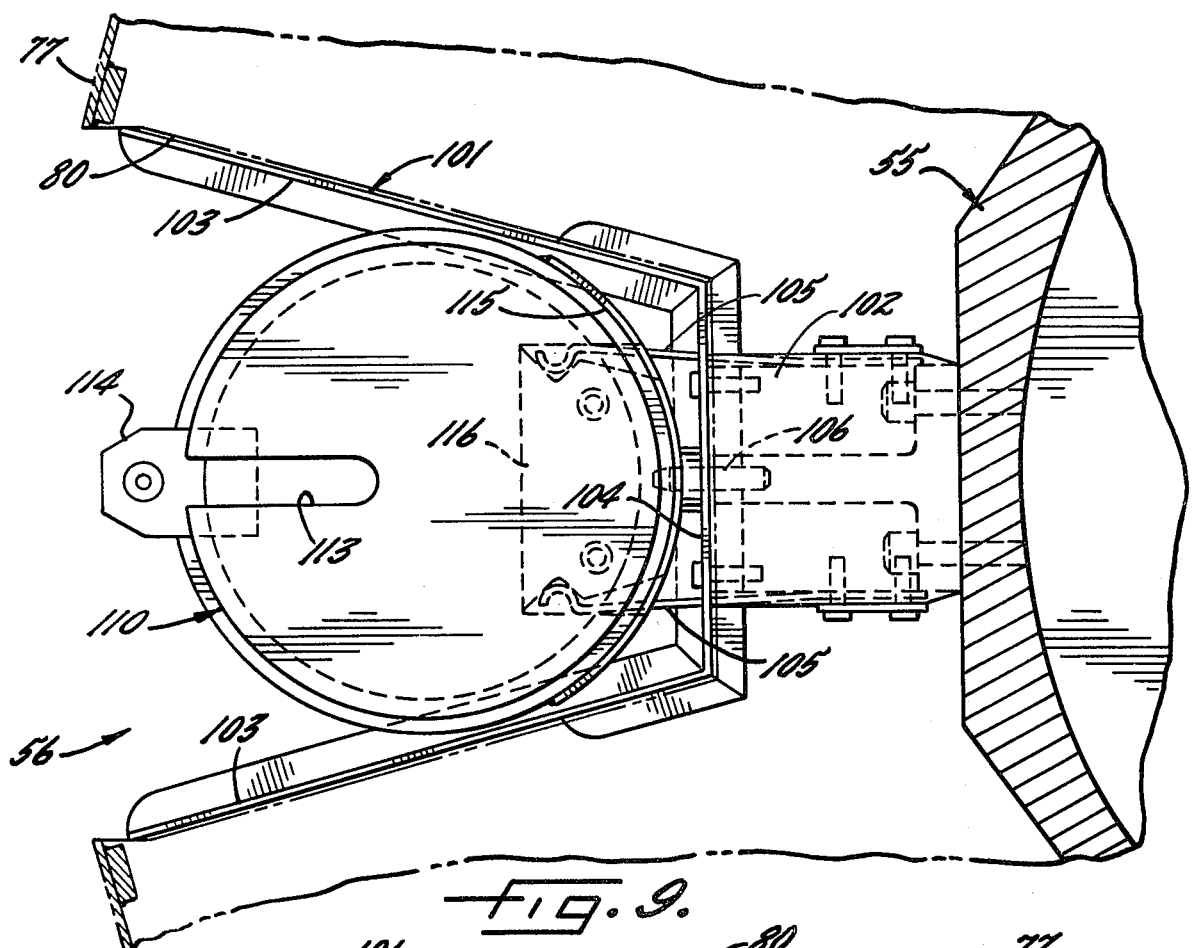
FIG. 9 is a cross-sectional view somewhat similar to FIG. 7 but showing the dummy tools in the magazine.
Figure 10:
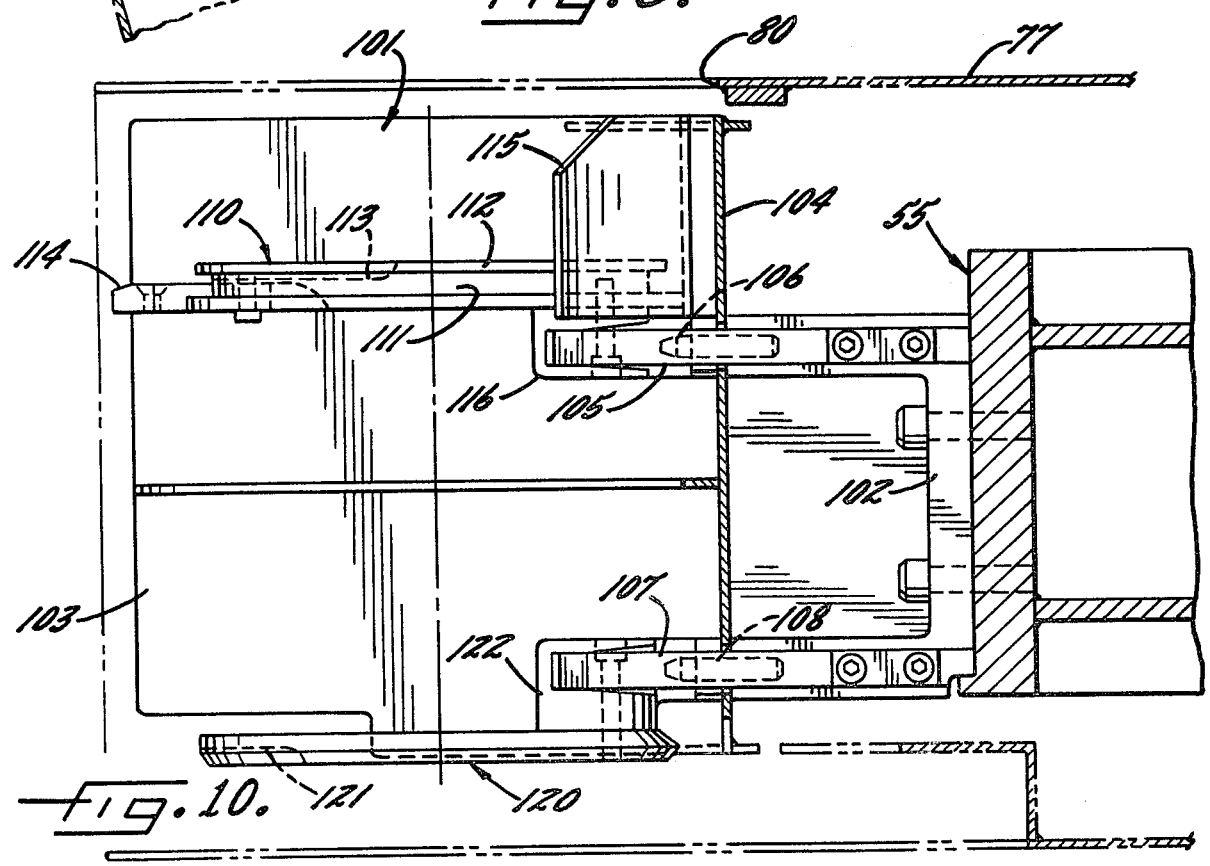
FIG. 10 is a side elevational view of the structure shown in FIG. 9 with certain parts being broken away and shown in section.

Vulnerable areas of the punch, stripper and die holders 34, 40 and 48 are protected from debris by covering those areas with shield or "dummy" tools when the torch 100 is operating. As shown in FIGS. 9 and 10, the bracket 102 which suports the shield 101 on the turret 55 also supports an upper pair of spring fingers 105, an upper pin 106, a lower pair of spring fingers 107, and a lower pin 108. The fingers and the pins project outwardly through the inner wall 103 of the shield 101.

The upper fingers 105 and the upper pin 106 releasably hold a dummy tool 110 which is adapted to close the lower ends of the punch and stripper holders 34 and 40 and also the sides of the socket 35 in the punch holder. As shown in FIG. 10, the dummy tool comprises a plate 111 whose upper end portion is substantially the same as the upper end portion of the stripper 41 and is formed with a flange 112. The plate is solid (i.e., there are no through holes in the plate) and its upper surface is formed with a keyway 113 (FIG. 9) for accommodating the key 93 of the punch holder 34. An apertured ear 114 projects rearwardly from one side of the plate 111 and assimilates the ear 45 of the stripper 41. Upstanding from the other side of the plate is an arcuate shield 115 which is adapted to close the sides of the socket 35 in the punch holder 34. A bracket 116 is located on the underside of the plate 111 beneath the shield 115 and is adapted to interfit releasably with the upper fingers 105 and the upper pin 106.

Preparatory to operating the torch 100, the holders 34, 40 and 48 are shifted to the tool changing station 56 to return the last-used tools to the turret 55. After the holders have backed out of the tool changing station to the standby position, the turret is indexed to bring the dummy tool 110 into the tool changing station. The holders then are re-advanced into the tool changing station and, as an incident thereto, the groove 42 of the stripper holder 40 slidably receives the flange 112 of the plate 111. The shot pin 44 then is actuated to lock the plate to the stripper holder. When the holder subsequently backs out of the tool changing station, the plate 111 moves with the holder and is pulled away from the fingers 105 and the pin 106 as shown in FIG. 11. The solid plate 111 thus closes off the lower ends of the punch and stripper holders 34 and 40 and, in addition, the shield 115 closes off the sides of the socket 35 of the punch holder. Accordingly, the interior surfaces of the punch and stripper holders are protected from debris from the torch 100.

A shield or dummy die adaptor 120 (FIGS. 10 and 11) also is used to cover the die holder 48 and to close off the hole 50 therethrough. As shown in FIG. 10, the dummy adaptor comprises a solid plate whose lower surface is formed with a keyway 121 for accommodating the key 96 of the die holder 48. A bracket 122 projects upwardly from the plate and is adapted to interfit with and to be held by the lower fingers 107 and the lower pin 108.

When the dummy tool 110 is picked up from the turret 55, the die holder 48 slides beneath the dummy adaptor 120 and is covered thereby. The arm 53 then is swung to its locked position to retain the dummy adaptor on the die holder. Accordingly, the dummy adaptor is pulled away from the fingers 107 and the pin 108 when the die holder 48 is backed away from the turret 55 (see FIG. 11). The dummy adaptor 120 covers the upper surfaces of the die holder 48 to prevent debris from accumulating on those surfaces and also to prevent debris from entering the opening 50.

Thus, the dummy tool 110 and dummy die adaptor 120 protect the vulnerable areas of the holders 34, 40 and 48 when the torch 100 is operating. The dummy tool and adaptor are automatically placed in and removed from the holders and thus the operator of the press 20 is relieved of that duty.

We claim:

1. A punch press comprising a support, a vertically reciprocable ram, a punch holder on the lower end of said ram and having means for releasably retaining a punch, a die holder spaced below and alined vertically with said punch holder and having means for releasably retaining a die, a tool magazine on said support and releasably holding a plurality of sets of vertically alined punches and dies, means for moving said magazine on said support to advance any selected one of said sets to a tool changing station, means mounting said punch and die holders on said support for bodily movement toward said magazine and into said tool changing station and for bodily movement away from said magazine and out of said tool changing station, means for moving said punch and die holders bodily toward and away from said magazine and said tool changing station while maintaining the punch holder and the die holder in vertical alinement, and means for actuating said retaining means to cause said punch and die holders to pick up a punch and die from said magazine when said punch and die holders are in said tool changing station and to release said punch and die to said magazine when said punch and die holders are next in said tool changing station.

2. A punch press as defined in claim 1 further including a stripper holder located beneath said punch holder and supported to move bodily with the punch holder toward and away from said magazine, each of said tool sets further including a stripper located between the punch and the die of the set and held releasably by said magazine, said stripper holder having means for releasably holding a stripper, and means for actuating said latter retaining means to cause said stripper holder to pick up a stripper from said magazine when said stripper holder is in said tool changing station and to release said stripper to said magazine when said stripper holder is next in said tool changing station.

3. A punch press as defined in either of claims 1 or 2 in which said tool magazine comprises a turret mounted on said support to rotate about an upright axis which remains in a fixed position relative to said support as said holders move toward and away from said tool changing station, said tool sets being spaced angularly around said turret and being advanced successively into said tool changing station when said turret is rotated about said axis.

4. A punch press as defined in eithers of claims 1 or 2 in which said means for moving said punch and die holders comprise an upper screw rotatably mounted on said support and operably connected to said punch holder and further comprise a lower screw rotatably mounted on said support and operably connected to said die holder, said screws extending parallel to one another, and reversible motor means for rotating said screws in unison.

5. A punch press comprising a support, a vertically reciprocable ram, a punch holder and a stripper holder on the lower end of said ram and having means for holding a punch and a stripper, respectively, a die holder spaced below and alined vertically with said punch and stripper holders and having means for releasably holding a die, a turret mounted on said support to rotate about a predetermined axis which is fixed relative to said support, a plurality of sets of vertically alined punches, strippers and dies spaced angularly around and held releasably by said turret, means for rotating said turret about said axis to advance any selected one of said sets to a tool changing station, means mounting said three holders on said support for bodily movement toward said turret and into said tool changing station and for bodily movement away from said turret and out of said tool changing station, means for moving said three holders bodily toward and away from said magazine and said tool changing station while maintaining the three holders in vertical alinement, and means for actuating said retaining means to cause said punch, stripper and die holders to pick up a punch, a stripper and a die respectively, from said turret when the three holders are in said tool changing station and to release said punch, stripper and die to said turret when the three holders are next in said tool changing station.

* * * * *